Feb. 10, 1959  S. R. RICH  2,873,392

SUPPORTS FOR MECHANICAL VIBRATORS

Filed April 19, 1957

INVENTOR.
Stanley R. Rich

2,873,392
Patented Feb. 10, 1959

2,873,392
SUPPORTS FOR MECHANICAL VIBRATORS

Stanley R. Rich, West Hartford, Conn.

Application April 19, 1957, Serial No. 653,944

18 Claims. (Cl. 310—26)

This invention relates to supports for mechanical vibrators.

In any system employing mechanical vibrators, it is usually necessary to provide a support for one or more vibrators, which will hold each vibrator in a prescribed position while interfering as little as possible with its function as a vibrator. The support should hold the vibrator against displacement during shipment and handling, as well as during normal operation of the system. According to this invention, I provide such a support employing a cellular solid material which while rigid enough to hold vibrators against displacement is able to couple only insignificant amounts of elastic wave energy from a vibrator. The solid material is able to be formed in place from a foaming plastic which is poured as a liquid mix around the vibrators and then cured after foaming, thus providing a new method of mounting vibrators. My invention is particularly valuable when used with housed vibrators for then the supporting structure can be prepared in the vibrator housing, and will prevent the vibrators from breaking loose in the housing after the housing is sealed. Further features of my invention will be made apparent in the following description of certain embodiments of it. This description refers to the accompanying drawing, wherein:

Figure 1:
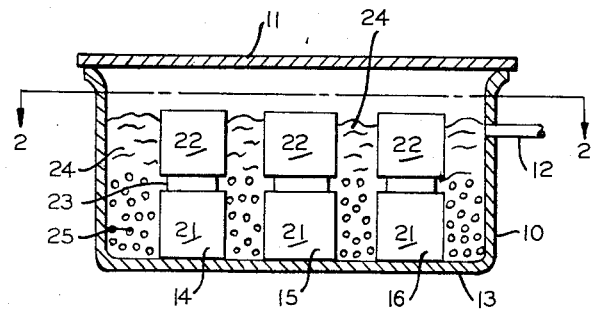
Fig. 1 is a vertical section through a housed vibrator assembly.
Figure 2:
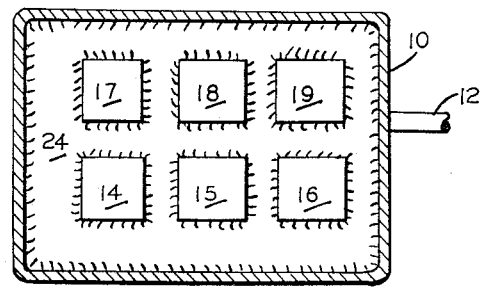
Fig. 2 is a top view along line 2—2 of Fig. 1.

Referring now to Figs. 1 and 2, a housing 10, open at one side (top in Fig. 1) is provided with a closure 11 and a tubular fitting 12. Six mechanical vibrators 14 to 19, inclusive, are located in the housing 10, each vibrator having one end face confronting a wall 13 (bottom in Fig. 1) of the housing. The vibrators may, for example, be constructed as disclosed in my copending application Serial No. 606,478 filed August 27, 1956. In such case, each vibrator will comprise two solid blocks 21 and 22 with an electromechanical transducer 23 sandwiched between them, the first block 21 being made of a material having lower density than the second block 22 (e. g. aluminum vs. steel). Electrical connections to the transducer elements 23 are made through the tubular fitting 12. When this vibrator is operated in a longitudinal mode, for example as a half-wave vibrator with the transducer material essentially at a node, the end face of the lower-density block 21 will vibrate at higher amplitude and velocity than the end face of the higher-density block 22. As shown in Fig. 1, the end faces of the higher amplitude and velocity confront the wall 13 of the housing 10, to which wall they are acoustically coupled. The higher-amplitude and velocity ends of the vibrators are then the load ends, and the confronting wall 13 cooperates as a diaphragm with them during operation of the system.

The remaining ends of the vibrators 14 to 19, inclusive, extend freely into the interior of the housing 10. These free ends constitute masses which can exert considerable force tending to separate the load ends from the diaphragm 13 if the system is shock loaded from any direction having a component parallel to the diaphragm 13. This happens, for example, if the system shown in Fig. 1 is dropped on its side. While cements or solders which may be used to bond the vibrators acoustically to the diaphragm wall 13 have considerable tensile and shear strength, their peel strength is not such that they can be depended upon to withstand all conceivable shock loadings, and the danger exists that the vibrators will become separated from the diaphragm wall 13 under shock load conditions. This is true whether the free ends are made of material having the same density as/or a greater or lesser density than, that of the ends having faces coupled to the diaphragm wall 13.

A rigid mechanical support for holding the free ends 22 of the vibrators substantially motionless in the container 10 is provided by a solid material 24 which surrounds all the free ends 22. The solid material 24 is chosen to be a material which will reduce to a minimum the amount of elastic wave energy extracted by the supporting structure from the vibrators. I have found that a foamy plastic material has the desired properties. I have also discovered methods of preparing it in place. In order to prepare the supporting structure in place, I first partly fill the container with loosely-packed particles 25, preferably of electrically insulating material, such as expanded mica, rock wool or fiber glass, to a level where substantially all of the lower blocks 21, the transducer materials 23 and a portion of the free-end blocks 22 are covered. Then I pour in a liquid mix of a foaming plastic, such as isocyanate foam, which foams and forms a cellular solid body. The liquid viscosity is such with respect to the sizes of the particles 25 that this mix does not substantially flow into the spaces between the loosely-packed particles. I then permit the mix to set: heat curing may be employed if desired to hasten setting. The loose fill particles extract practically no elastic wave energy from the sides of the vibrators, and the amount of elastic wave energy coupled out by the solid foam is insignificant. Housed vibrator systems assembled in this fashion can be dropped and otherwise roughly handled without separating the vibrators from the diaphragm wall 13. The foaming plastic (isocyanate) adheres to the vibrators and the housing, thus distinguishing my supporting structure from supports made of fillings of cork, corprene, and the like. The latter inevitably leave small spaces between themselves and the vibrators, which can permit shock loadings to separate the vibrators from the diaphragm wall 13.

Figure 3:
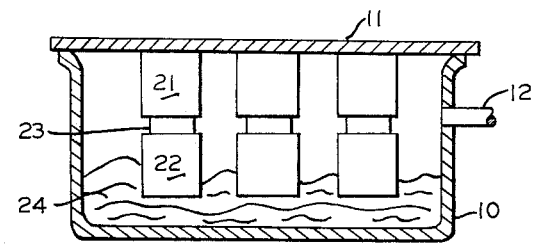
Fig. 3 is a vertical section through another housed vibrator assembly.

Fig. 3 illustrates a structure similar to that of Fig. 1 in which the loose particle filling is not needed. Similar elements have like reference characters in the various figures. Here the load ends 21 of the vibrators are coupled to the closure plate 11 of the housing 10. The housing is partly filled with the liquid mix which yields the support structure 24, and the closure plate is then put in place with the vibrators hanging from it so that the free ends 22 are each partly immersed in the liquid mix. Then the steps of foaming and hardening of the cellular solid support structure 24 are carried out. Clearly, electrical connections to the electromechanical transducer elements 23 can again be made through the tubular fitting 12. The closure 11 is rigidly fastened to the housing 10, by any suitable means.

The embodiments illustrated and described herein are illustrations only of the invention, and other embodiments will occur to those skilled in the art. No attempt has been made to exhaust all possibilities, but rather only to illustrate the principles of the invention and the best manner I now know to practice it.

What I claim is:

1. Method of mounting a mechanical vibrator in a housing comprising the steps of securing one end of the vibrator to the bottom of the housing, partly filling the housing with loosely-packed solid particles until the vibrator is partly immersed therein, and surrounding the free end of the vibrator with a mix of a liquid material which foams and forms a cellular solid, said material in liquid form having a thickness such that it will not substantially pass into the spaces between the loosely-packed particles.

2. Method of mounting a mechanical vibrator in a housing which is open at the top and has a separate top closure, comprising the steps of securing one end of the vibrator to the top closure, partly filling the housing with a mix of a liquid material which foams and forms a cellular solid, placing said top closure in place on said housing to immerse the free end of said vibrator in said mix, and holding said vibrator substantially motionless until said mix forms a cellular solid.

3. In combination, a mechanical vibrator having two ends, a container, said vibrator being located in said container with one end acoustically coupled to a wall thereof, and supporting means in said container holding said vibrator at the other end against movement with respect to said container.

4. Arrangement according to claim 3 wherein said supporting means is a cellular solid material which adheres to both said vibrator and said container.

5. In combination, a mechanical vibrator having two ends, a container open at one side, a closure for said container, said vibrator being mounted at one end to a side of said closure and extending at the other end into said container, and supporting means in said container holding said other end against movement with respect to said container.

6. Arrangement according to claim 5 wherein said supporting means is a cellular solid material which adheres to both said vibrator and said container.

7. In combination, a mechanical vibrator having two ends, a container, said vibrator being located in said container with one end acoustically coupled to a wall thereof, loosely-packed filler particles in the region of said container surrounding said one end, and supporting means in said container holding said vibrator at the other end against movement with respect to said container.

8. Arrangement according to claim 7 wherein said supporting means is a cellular solid material which adheres to both said vibrator and said container.

9. In combination, a mechanical vibrator having two ends of which the first is adapted to vibrate at higher velocity than the second at the same vibration frequency, a container, said vibrator being located in said container with said first end acoustically coupled to a wall thereof, and supporting means in said container holding said vibrator at said second end against movement with respect to said container.

10. Arrangement according to claim 9 wherein said supporting means is a cellular solid material which adheres to both said vibrator and said container.

11. In combination, a mechanical vibrator having two ends of which the first is adapted to vibrate at higher velocity than the second at the same vibration frequency, a container open at one side, a closure for said container, said vibrator being mounted at said first end to a side of said closure and extending at said second end into said container, and supporting means in said container holding said second end against movement with respect to said container.

12. Arrangement according to claim 11 wherein said supporting means is a cellular solid material which adheres to both said vibrator and said container.

13. In combination, a mechanical vibrator having two ends of which the first is adapted to vibrate at higher velocity than the second at the same vibration frequency, a container, said vibrator being located in said container with said first end acoustically coupled to a wall thereof, loosely-packed filler particles in the region of said container surrounding said first end, and supporting means in said container holding said second end against movement with respect to said container.

14. Arrangement according to claim 13 wherein said supporting means is a cellular solid material which adheres to both said vibrator and said container.

15. In combination, a longitudinal vibrator acoustically coupled at a first end to a load, and a support for the second end of said vibrator, said support being made of a cellular solid material surrounding and adhering to said vibrator solely at said second end.

16. In combination, a longitudinal vibrator acoustically coupled at a first end to a diaphragm, a housing surrounding said diaphragm and vibrator, and being everywhere spaced away from said vibrator, and a body of cellular solid material surrounding and adhering to said vibrator solely at the second end thereof, said body also adhering to said housing whereby to support said second end of said vibrator with respect to said housing.

17. The combination according to claim 16 wherein said vibrator is less dense at said first end than at said second end and is dimensioned to be a longitudinal resonant vibrator, whereby said cellular solid material adheres to the end having the lesser motional amplitude during operation.

18. The combination according to claim 16 wherein said vibrator is less dense at said first end than at said second end and is dimensioned to be a longitudinal resonant vibrator, whereby said cellular solid material adheres to the end having the lesser motional amplitude during operation.

References Cited in the file of this patent

UNITED STATES PATENTS

| | | |
|---|---|---|
| 1,982,319 | Perry | Nov. 27, 1934 |
| 2,170,206 | Mason | Aug. 22, 1939 |
| 2,398,117 | Rost et al. | Apr. 9, 1946 |
| 2,713,127 | Harris | July 12, 1955 |
| 2,780,350 | Simon et al. | Feb. 5, 1957 |